2,957,032
PERFLUORODIMETHYLCYCLOBUTANES

Murray Hauptschein, Glenside, and Milton Braid, Philadelphia, Pa., and Francis E. Lawlor, Mesa, Ariz., assignors to Pennsalt Chemicals Corporation, Philadelphia, Pa., a corporation of Pennsylvania No Drawing. Filed Dec. 13, 1957, Ser. No. 702,537

7 Claims. (Cl. 260—648)

This invention relates to certain new fluorocarbons and, in particular, to dimers of perfluoropropene and to a method for their manufacture.

Great interest has been shown in recent years in fluorocarbons, that is, compounds consisting entirely of fluorine and carbon. These materials are resistant to chemical attack and to thermal degradation, and have proved useful in a variety of industrial applications such as in lubricants, refrigerants, heat transfer media and dielectrics where there is need for thermal and chemical stability.

It has now been found that perfluoropropene $$CF_3CF=CF_2$$

can be dimerized by a simple process to give normally liquid products which have physical characteristics making them especially useful as refrigerants, particularly in air conditioning systems. The novel dimers are saturated compounds having a four carbon ring structure.

The present application is a continuation-in-part of our copending application Serial No. 644,967, filed March 11, 1957, and now abandoned, which application is a continuation-in-part of our copending application Serial No. 614,821, filed October 9, 1956.

In our copending application, Serial No. 614,821, filed October 9, 1956, there are disclosed processes for forming telomers of perfluoropropene, in which perfluoropropene is heated with iodine or with certain telogens. In certain of the specific examples, namely in Examples XIII and XXX, perfluoropropene was heated to temperatures above about 240° C. in the presence of iodine and 1-iodoperfluoropropane, respectively. In addition to the telomeric products, a fraction boiling at about 45° C. was obtained in these experiments. This fraction has now been identified as a dimer of perfluoropropene.

One aspect of the invention, therefore, includes, as a new class of chemical compounds, normally liquid dimers of perfluoropropene. It will be understood that several isomeric forms of perfluoropropene dimer are included within the scope of the invention. The novel class of dimers includes compounds whose basic structure comprises a saturated, four member ring having two perfluoromethyl groups subtended therefrom. These compounds may be represented by the general formula

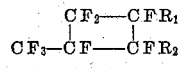

where one of $R_1$ and $R_2$ is fluorine and the other is a —$CF_3$ group. There are four possible isomeric forms of this basic structure, viz:

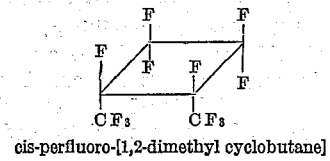
cis-perfluoro-[1,2-dimethyl cyclobutane]

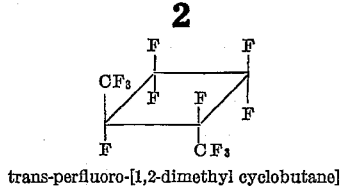
trans-perfluoro-[1,2-dimethyl cyclobutane]

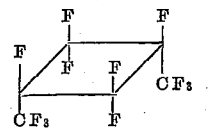
cis-perfluoro-[1,3-dimethyl cyclobutane]

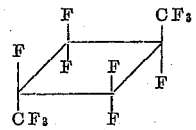
trans-perfluoro-[1,3-dimethyl cyclobutane]

In accordance with another aspect of the invention the dimers of perfluoropropene described above are made by heating perfluoropropene to a temperature between about 240° C. and about 800° C., preferably between about 260° C. and about 550° C. It has been found that an equilibrium exists between perfluoropropene and its dimers, i.e., $$2C_3F_6 \rightleftarrows (C_3F_6)_2$$

and that, by a suitable combination of temperature and pressure, good conversions to dimer can be obtained.

The pressure at which the reaction is conducted may vary between wide limits, depending on the temperature. There is no theoretical upper limit to the pressure. Normally the pressure will range from about 10 p.s.i.g. to about 100,000 p.s.i.g., with pressures from 100 to 10,000 p.s.i.g. being preferred.

The reaction time is not a critical factor. Small amounts of dimer have been obtained at reaction times of less than one second. The period required for satisfactory conversion to be reached will vary with the other reaction conditions but for a practical process will normally be from say one minute to say a day.

As indicated above, and as will appear from certain of the specific examples to be given, perfluoropropene dimer can be obtained when perfluoropropene is heated in the presence of iodine or 1-iodoperfluoropropane. However, the presence of such other reactants decreases the yield of dimer, and hence it is preferred to conduct the present process in the substantial absence of any reactant other than perfluoropropene itself. Materials which do not enter into the reaction, however, such as catalytic materials, or materials which remain substantially inert, may be present.

In carrying out the invention, various techniques may be used. Most simply, an appropriate amount of perfluoropropene is sealed in a pressure vessel such, for example, as a Monel or steel autoclave or a Pyrex tube, and heated for a time sufficient to allow equilibrium to be reached or approached, or to give a satisfactory conversion. Alternatively, perfluoropropene can be passed through a hot tube in a flow process preferably at pressures above atmospheric.

The initial product obtained from the processes described consists of a mixture of isomeric dimers having a vapor pressure range from about 110 to about 130 mm. at 0° C. and from about 290 mm. to about 310 mm.

at 20° C. It boils in the narrow range of about 43° to about 45° C. at 760 mm.

These properties permit more efficient refrigeration systems to be designed, particularly where centrifugal compressors are to be used and in special high temperature (200°–300° F.) air-conditioning systems. Their chemical inertness eliminates corrosion problems experienced with conventional refrigerants when used in contact with metal at these temperatures.

The initial dimer product consists of both the perfluoro-(1,2-dimethyl cyclobutane) and the perfluoro-(1,3-dimethyl cyclobutane) isomers. Using conventional distillation techniques three fractions have been separated which have boiling points of 45.1° C., 43.6° C. and 42.8° C. and are referred to below as A, B and C respectively. Cut A is pure cis-perfluoro-[1,2-dimethyl cyclobutane], cut B is trans-perfluoro-[1,2-dimethyl cyclobutane], and cut C is considered to contain both the cis- and trans- form of perfluoro-[1,3-dimethyl cylobutane].

The invention will be further described with reference to the following specific examples, it being understood that these examples are given for purposes of illustration only and are not to be taken as in any way limiting the invention beyond the scope of the appended claims.

EXAMPLE I

Into a 300 ml. Monel autoclave which has been cooled to −75° C., 317 g. (2.12 moles) of perfluoropropene were introduced by gaseous transfer in vacuo. The autoclave was sealed and heated while shaking at 260° to 270° C. for 208 hours. The pressure dropped from 5800 p.s.i.g. to 3700 p.s.i.g. during this period. After cooling to room temperature the autoclave was vented through a system of refrigerated receivers. One hundred and sixty-five grams of low-boiling liquid condensate were collected in the Dry Ice-cooled receivers and 150 grams of colorless liquid were collected, mostly from the autoclave and the first brine-cooled receivers. By careful fractional distillation these products were shown to consist entirely of 165 grams of unreacted perfluoropropene and 150 grams of $(C_3F_6)_2$. The latter fraction boiled entirely at 44° to 45° C., $n_D^{26.5}$ 1.261.

*Analysis.*—Calculated for $C_6F_{12}$: C, 24.0; F, 76.0 Found: C, 23.5, 24.4; F, 75.7. Mol. wt., calculated: 300. Found: 301.

Thus the yield of dimer was 100% and the conversion was 47%.

Careful fractionation of the dimer provided a separation into the fractions A and B mentioned above. Thus the product contained about 55% of cut A boiling at 45.1° C., 45% of cut B boiling at 43.6° C., and a trace of cut C.

EXAMPLE II

Using the equipment and general procedure of Example I, 300 grams (2.0 moles) of perfluoropropene were heated at 350° C. with shaking for five hours. A stable maximum pressure could not be observed since the pressure had begun to drop rapidly as the reaction temperature was reached, but the pressure drop was estimated to be from a calculated 8500 p.s.i.g. to about 4200 p.s.i.g., about one-half occurring during the first hour. From this reaction, 85 grams of perfluoropropene and 215 grams of the dimer of perfluoropropene, boiling point 43° to 45° C., $n_D^{26.5}$ 1.261, were obtained. Thus the yield was 100% and the conversion 72%.

Careful fractionation of the dimer provided 51% of cut A with a boiling point of 45.1° C., 46% of cut B with a boiling point of 43.6° C., and 3% of cut C with a boiling point of 42.8° C.

EXAMPLE III

Using the equipment and general procedure of Example I, 195 grams (1.3 moles) of perfluoropropene were heated at 390° C. with shaking for 24 hours. Again the maximum initial pressure could not be observed since the pressure had begun to drop rapidly as the reaction temperature was reached, and the final pressure was 1950 p.s.i.g. From this reaction, 23 grams of perfluoropropene and 168 grams of the dimer of perfluoropropene were obtained. Thus the yield was 98% and the conversion 88%.

Careful fractionation of the dimer provided cut A in an amount of 15% of the dimer, cut B in an amount of 80% of the dimer and cut C in an amount of 5% of the dimer.

EXAMPLE IV

Using the equipment and general procedure of Example I, 340 grams (2.3 moles) of perfluoropropene were heated at 450° C. with shaking for 5 hours. A maximum pressure of 8800 p.s.i. was attained when the temperature reached 310° after one hour's heating. During the next three hours, while the temperature was raised slowly to 450°, the pressure varied between 6800 and 8800 p.s.i. The temperature was then held at 450±10° for the remainder of the reaction, the pressure dropping from 6950 p.s.i. to a minimum of 6500 p.s.i. after 2.5 hours, and then rising to 7400 p.s.i. after a total of 21 hours. It is clear, therefore, that a very much higher conversion and yield of dimers would have been obtained had this reaction been stopped when the minimum pressure was reached at 450°. From this reaction 20.4 grams of the dimer of perfluoropropene were obtained.

Careful fractionation of this dimer provided 40% of cut B and 60% of cut C with only a trace of cut A being present.

EXAMPLE V

Using the equipment and general procedure of Example I, 350 grams (2.3 moles) of perfluoropropene were heated at 250° C. with shaking for 19 hours. The pressure dropped from 1700 p.s.i.g. to 6500 p.s.i.g. during this period. From this reaction, 322 grams of perfluoropropene and 28 grams of the dimer of perfluoropropene were obtained. Thus the yield was 100% and the conversion 8%. Fractionation of the dimer resulted in 17 grams of cut A (60% of the dimer) and 11 grams of cut B (40% of the dimer). Only a trace of cut C was present as indicated from the infra-red spectra.

The infra-red absorption spectra of the various fractions of Examples I to V have the following characteristic bands (in microns): Cut A— 7.24, 7.42, 7.57, 7.92, 8.22, 8.40, 9.09, 9.39, 9.89, 11.01, 11.35 and 13.63. For cut B, the values are 7.25, 7.42, 7.70, 7.96, 8.22, 9.20, 9.59, 11.01, 11.35, and 13.8. The values for cut C are 7.42, 7.70, 7.92, 8.22, 8.34, 8.56, 8.88, 9.46, 10.52, 11.84, 14.15, 14.5 and 14.8.

The composition of the dimer was found to vary significantly with temperature of formation. In the temperature range from 250° to 350°, cuts A and B were formed almost exclusively in nearly equal amounts, cut A being more favored at the lower temperature. A marked shift favoring cut B was observed when the reaction temperature was raised to 390°. At the still higher temperature of 450° cut C, which had been formed in only very small amounts at the lower temperatures, became the predominant isomer.

The thermal stabilities of the three isomers were determined at 430°. In four hours, A underwent 67% decomposition, forming 26% of perfluoropropene and 41% of B. Under identical conditions, B underwent 30% decomposition, producing 10% of perfluoropropene and 20% of A. In contract, there was no evidence of any decomposition of C under these conditions.

The chemical evidence clearly favors a perfluoro-[1,2-dimethyl-cyclobutane] structure for cut A and a perfluoro-[1,3-dimethyl-cyclobutane] structure for cut C. The 1,2-structure would be expected to predominate at the lower temperatures of formation and the 1,3-structure at the higher reaction temperatures. Furthermore, the known order of thermal stability of open chain fluorocarbons,

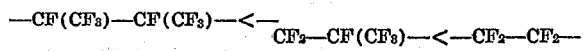
—CF(CF₃)—CF(CF₃)—<—
    CF₂—CF(CF₃)—<—CF₂—CF₂— confirms the above assignments. The difference in rates of formation and dissociation indicates that cut A is cis-perfluoro-[1,2-dimethyl-cyclobutane] and cut B is trans-perfluoro-[1,2-dimethyl-cyclobutane]. Cut C which is identified as perfluoro-[1,3-dimethyl-cyclobutane] is considered to contain both cis- and trans- forms.

Further evidence that cut A is perfluoro-[1,2-dimethyl-cyclobutane] while cut C is a perfluoro-[1,3-dimethyl-cyclobutane] is supported by n.m.r. fine structure of the dimer.

The dimer of perfluoropropene, obtained as, for instance in Example II, when used as the refrigerant in centrifugal machines for air-conditioning systems has improved properties over the two common commercial refrigerants used for this purpose, i.e. 1,1,2-trichlorotrifluoroethane and trichloromonofluoromethane. For example, it is well known in the art of refrigeration and specifically as applied to centrifugals, that high vapor density and, in particular, a high ratio of molecular weight to boiling point are desirable for most efficient operation.

The data cited below in Table I clearly illustrate the definite advantages of the dimer of perfluoropropene in these respects:

*Table I*

| Refrig. | Mol. Wt. | B.P., °C. | Mol. Wt. over B.P., °C. | Density of Saturated Vapor at B.P. | |
|---|---|---|---|---|---|
| | | | | g./liter | lbs./ft.³ |
| CFCl₃ | 137.38 | 23.77 | 5.78 | 5.85 | 0.365 |
| CF₂ClCFCl₂ | 187.39 | 47.57 | 3.94 | 7.38 | 0.461 |
| (C₃F₆)₂ | 300.00 | 44.5 (average) | 6.74 | 11.51 | 0.719 |

In addition to these advantages, the dimer of perfluoropropene is unique in being completely noncorrosive. The material does not react with moisture, oils, metals or any of the substances with which refrigerants may come in contact.

That the novel process involves the equilibrium $$2C_3F_6 \rightleftarrows (C_3F_6)_2$$

which is dependent on pressure and temperature, is illustrated by the following specific example:

EXAMPLE VI

Samples of $C_3F_6$ or $C_6F_{12}$ were sealed up in thick-walled Pyrex test tubes of ca. 9 ml. capacity and heated in a Carius tube furnace. The tubes were then cooled in liquid nitrogen and their contents analyzed by infra red. The results are given in Tables II and III below:

*Table II*

| Run | Reactant, grams | | Time, Hours | Temp., °C. | Cal'd Pressure, Atm. | | Composition Products, Wt. Percent (C₃F₆)₂ |
|---|---|---|---|---|---|---|---|
| | C₃F₆ | (C₃F₆)₂ | | | Initial | Final | |
| I | | ca 0.45 | 2 | 300 | 7.9 | 7.9 | 100 |
| II | | ca 0.45 | 1 | 410 | 9.3 | 9.8 | 97.8 |
| III | | 0.455 | 5.5 | 430 | 9.6 | 13.3 | 72 |
| IV | 0.499 | | 5.5 | 430 | 21.6 | 16.9 | 43 |
| V | | ca 0.45 | 1 | 510 | 10.7 | 16.9 | 42 |
| VI | ca 0.5 | | 1 | 510 | 24 | 19.7 | 34 |

In Table II above, the composition of the dimer is in proportions of cuts A, B and C changed as shown in Table III below:

*Table III*

| Run | Initial Dimer Composition, Wt. Percent | | | Final Dimer Composition, Wt. Percent | | |
|---|---|---|---|---|---|---|
| | A | B | C | A | B | C |
| I | 49 | 49 | 2 | 49 | 49 | 2 |
| II | 49 | 49 | 2 | 50 | 50 | trace |
| III | 49 | 49 | 2 | 25 | 70 | 5 |
| IV | | | | 35 | 55 | 10 |
| V | 49 | 49 | 2 | 20 | 70 | 10 |
| VI | | | | 15 | 65 | 20 |

EXAMPLE VII

Perfluoropropene was passed through a Monel tube at about 730° C. Contact time was about one second. The product was almost entirely unchanged perfluoropropene, along with olefinic byproducts including perfluoroisobutene.

The following examples, VIII and IX, illustrate the fact that perfluoropropene dimer can be made in the presence of iodine or 1-iodoperfluoropropane. These examples correspond to Examples XIII and XXX of our copending application Serial No. 614,821 referred to above.

EXAMPLE VIII

A Monel autoclave was charged with 27.6 grams of iodine and 202 grams of perfluoropropene. The autoclave was heated with shaking at 200 to 250° for 300 hours. There was recovered approximately 155 grams of perfluoropropene and 33 grams of material boiling above room temperature in vacuo were collected. The most volatile fraction (12 grams) boiled up to 53° C. at less than 1 mm. and contained about 60% by weight perfluoro-[dimethylcyclobutane]. This product was richer in isomer C than dimers obtained under similar reaction conditions but without iodine. The following three higher boiling fractions were isolated:

(1) A light oil boiling at 53–75° C. at less than 0.1 mm.

(2) A medium oil, boiling at 75–105° C. at less than 0.1 mm.

(3) A low melting solid boiling at 105 to approximately 200° C. at less than 0.1 mm.

EXAMPLE IX

A 2.7 l. 316 stainless steel autoclave was charged with 875 grams of iodoperfluoropropane and 2050 grams of perfluoropropene and then heated at 200° C. for 60 hours with continuous shaking. The temperature was then allowed to rise to about 300°–305° C. for several hours. From this reaction were recovered 1355 grams of perfluoropropene, ca. 65 grams of iodine, and 1360 grams of higher boiling products. The latter were shown to be composed of iodine-free stabilized fluorocarbon materials in addition to the usual telomer iodides. Fractionation of this material by means of a 1 inch diameter by 1 foot glass helices-packed column was used to separate 667 grams of 2-iodoperfluorohexane. The remaining 693 grams of product (ranging from oils to solids) boiling from 100° C. at 100 mm. to >110° C. ca. 0.1 mm. consisted of approximately 20% by weight of perfluoro-5,6-dimethyldecane, 25% of higher coupling products and 55% of higher telomer iodides.

There was also obtained an 89 gram fraction boiling at ca. 30–50° C. at atmospheric pressure which exhibited a refractive index too low (ca. 1.29) to be solely recovered $C_3F_7I$. This fraction was therefore treated with alcoholic potassium hydroxide to remove the iodide as the gas $C_3F_7H$. Elimination as the hydride accounted for approximately 60% of the original mixture. Most of the remaining product, boiling point 34°–47° C., consisted of a large proportion of perfluoro[dimethylcyclobutane] as shown by comparison of the infra-red spectrum with that of an authentic specimen. There was also isolated a small fraction, boiling point 57°–58° C., which analyzed as $C_6F_{14}$ but was shown by its infra-red spectrum not to be n-$C_6F_{14}$.

A consideration of the foregoing specification shows that the invention provides a simple, straightforward method for producing liquid perfluoropropene dimers, new compounds whose physical properties make them especially useful as refrigerants in applications where resistance to high temperatures and chemical stability are required. The novel materials are also useful as dielectrics and heat transfer fluids, and their fluid properties make them useful as working media in vapor turbines, as, for example, in automobiles.

What we claim is:
1. Compounds having the structure

$$\begin{array}{c} CF_2\text{——}CFR_1 \\ | \qquad\qquad | \\ CF_2\text{—}CF\text{——}CFR_2 \end{array}$$

where one of $R_1$ and $R_2$ is fluorine and the other is a —$CF_3$ group.

2. Perfluoro-[1,2-dimethylcyclobutane].
3. Perfluoro-[1,3-dimethylcyclobutane].
4. A method for making a dimer of perfluoropropene which comprises heating perfluoropropene to between about 240° C. and about 800° C., at a perfluoropropene pressure from about 10 p.s.i.g. to about 100,000 p.s.i.g. in the substantial absence of any other reactant.
5. The method claimed in claim 4 wherein the perfluoropropene pressure is between about 100 and about 10,000 p.s.i.g.
6. The method claimed in claim 4 wherein the temperature is between about 260° C. and about 550° C.
7. A method for making a dimer of perfluoropropene which comprises heating perfluoropropene at between about 260° C. and about 550° C. at a perfluoropropene pressure between about 10 p.s.i.g. and about 10,000 p.s.i.g.

References Cited in the file of this patent
UNITED STATES PATENTS

| | | |
|---|---|---|
| Re. 23,425 | Harmon | Oct. 30, 1951 |
| 2,456,027 | Simons | Dec. 14, 1948 |
| 2,729,613 | Miller | Jan. 3, 1956 |

Notice of Adverse Decision in Interference

In Interference No. 91,876 involving Patent No. 2,957,032, M. Hauptschein, M. Braid and F. E. Lawlor, PERFLUORODIMETHYLCYCLOBUTANES, final judgment adverse to the patentees was rendered Jan. 30, 1963, as to claims 1, 2 and 3.

[*Official Gazette March 30, 1965.*]